K. LAUER.
MEASURING INSTRUMENT.
APPLICATION FILED NOV. 6, 1920.
1,405,711.
Patented Feb. 7, 1922.
Fig. 1.
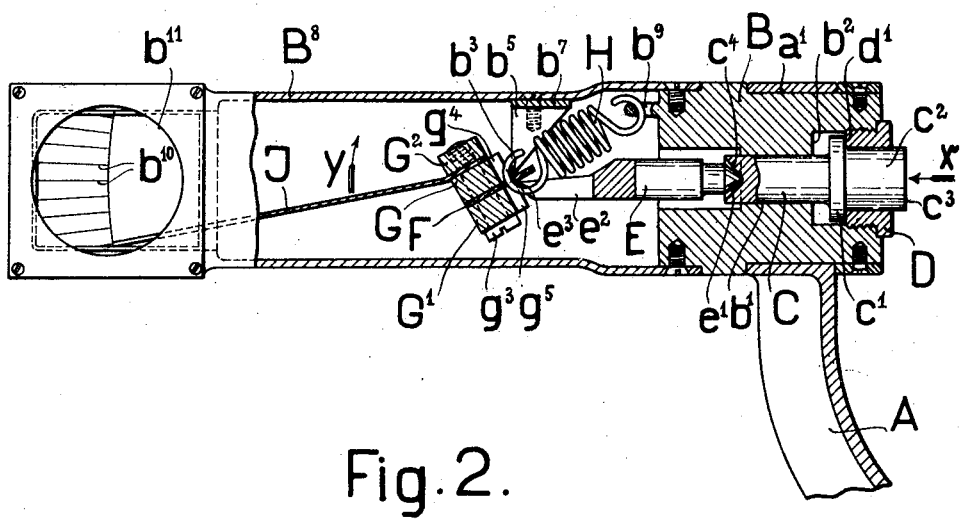
Fig. 2.
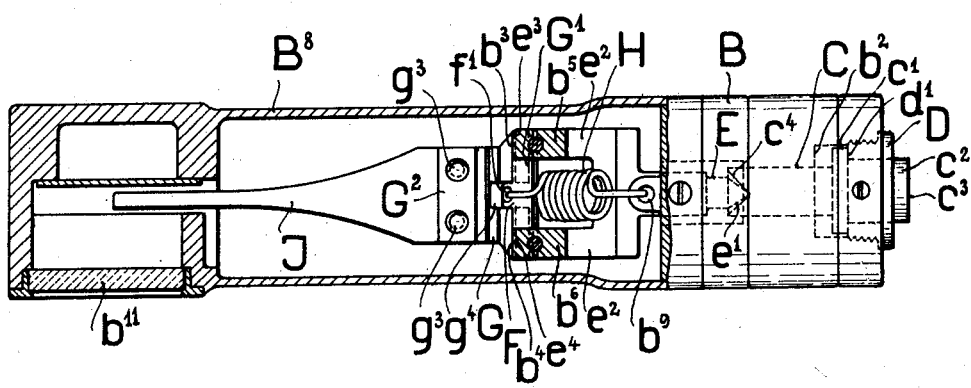
Fig. 3.
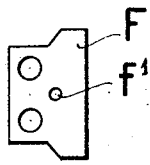
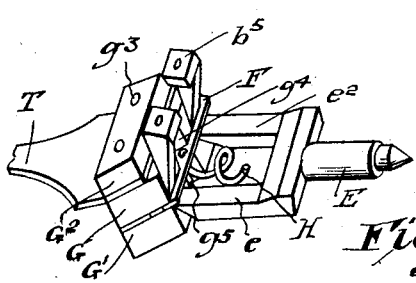
Fig. 4.
Inventor
Karl Lauer
By Knight Bros
Attys

UNITED STATES PATENT OFFICE.

KARL LAUER, OF KARLSKOGA, SWEDEN, ASSIGNOR TO FRIED. KRUPP AKTIENGESELL-SCHAFT, OF ESSEN-ON-THE-RUHR, GERMANY.

MEASURING INSTRUMENT.

1,405,711.  Specification of Letters Patent.  Patented Feb. 7, 1922.

Application filed November 6, 1920. Serial No. 422,376.

*To all whom it may concern:*

Be it known that I, KARL LAUER, residing at Karlskoga, Sweden, a citizen of the German Republic, have invented a certain new and useful Improvement in Measuring Instruments, (for which I have filed application in Germany, Oct. 7, 1919), of which the following is a specification.

This invention relates to measuring instruments of the type having a lever forming the movable element of the indicating device and lodged on knife-edges projecting into notches formed in said lever. The object of the invention is firstly to produce a particularly simple form of construction for such instruments to obtain small dimensions and a very high accuracy of measurement.

An embodiment of the subject matter of the invention is illustrated by way of example in the annexed drawing in which:

Fig. 1 is a longitudinal mid-section of a caliper gauge, with some parts broken away, Fig. 2 a corresponding top view, partly in section, Fig. 3 is a detail of the index mounting means, and Fig. 4 is a detail perspective view.

Referring to the drawing, at the one extremity of the semicircular limb A of the caliper gauge (Fig. 1) there is arranged a cylindrical hole $a^1$, the axis of which is parallel to the diameter terminating the semi-circle formed by the limb A. Within the hole $a^1$ there is lodged to rotate but not to shift a substantially cylindrical body B. This latter is provided with a hole $b^1$ disposed axially within which a bolt C is adapted to be displaced. The extent to which the bolt C may be displaced is limited by the end faces $b^2$ and $d^1$ of a cylindrical hole and of a screw D screwed therein, against which latter the bolt C is adapted to bear by means of a collar $c^1$. The bolt C is provided with an end portion $c^2$ projecting through a hole formed in the screw D, into the interior of the limb A of the caliper gauge; said portion $c^2$ being with its front end $c^3$, for its part constituting a measuring surface, oppositely disposed to the corresponding front end of a bolt (not shown) secured to the other end of the semicircular limb A. Hence, the bolt C forms the displaceable measuring bolt of the caliper gauge. At its inner end, the bolt C is provided with a conical hole $c^4$ into which the conical point $e^1$ of a bolt E is caused to project. This bolt E terminates at its other end in a two-pronged fork, the prongs $e^2$ of which are provided with knife-edges $e^3$ $e^4$ disposed along a straight line. At a very short distance remote from and parallel to the knife-edges $e^3$ and $e^4$, there are arranged two supplemental knife-edges $b^3$ and $b^4$, likewise disposed along a straight line and mounted on an element $b^7$ having two wedge-shaped members $b^5$ and $b^6$. The element $b^7$ is fixed by screws to the inside wall of a hollow cylindrical body $B^8$ disposed coaxially to the body B, and rigidly connected thereto. Into the small gap formed between the knife-edges $e^3$, $e^4$ and $b^3$, $b^4$, projects a very thin and perfectly level sheet F of the shape disclosed more particularly by Fig. 3. The sheet F is disposed, with those of its portions extending beyond the said gap, between two members G, $G^1$ which, conjointly with a third member $G^2$, form a block and are secured together in the manner shown in the drawing by means of two screws $g^3$. In the sheet F there is formed a hole $f^1$ into which is slipped the one end of a tension spring H, the opposite end of which engages an eye $b^9$ secured to the body B. Within the members G, $G^1$ there are formed slots $g^4$, $g^5$ of the kind disclosed in the drawing through which the one end of the spring can pass. By means of the tension spring H, the block G, $G^1$, $G^2$ is forced, at its corners formed by the projecting portion of the sheet F, against the knife-edges $b^3$, $b^4$ and $e^3$, $e^4$. By this arrangement the bolt E is maintained in suspension, as clearly shown in Fig. 1. To the block G, $G^1$, $G^2$ there is fixed an index J consisting of a tongue-shaped metal strip; the end of said index, when in the position shown in Fig. 1 points to zero of a scale $b^{10}$ (Fig. 1). Each division marked on the scale $b^{10}$ corresponds to a very minute measure of length, say, for example, $\frac{1}{100}$ mm. The scale $b^{10}$ is arranged within the interior of the body $B^8$ and may be observed, together with the point of the index J, through a sight-opening $b^{11}$. The index J, forming the movable element of the indicating device, together with the block G, $G^1$, $G^2$ therefore constitutes a lever lodged by means of two notches established by the projecting of the sheet F, between the knife-edges $b^3$, $b^4$ and $e^3$, $e^4$.

In use, the caliper gauge is applied to the body to be measured in such a manner that the measuring surface $c^3$ as well as the corresponding surface of the oppositely disposed bolt (not shown), will touch the exterior of the surface of the body to be measured. In the event of the dimension of this body proving to be somewhat larger than the distance existing intermediate the said measuring surfaces, then the bolt C is slightly displaced in the direction indicated by the arrow $x$ in Fig. 1. The bolt E, held in suspension by the tension spring H, participates in this displacement and the knife-edges $e^3$, $e^4$, arranged at the prong-shaped ends $e^2$ cause the sheet F and therewith the block G, $G^1$, $G^2$ and the index J secured thereto, to rotate in the direction indicated by the arrow $y$ (Fig. 1) against the action of the spring H about the stationary knife-edges $b^3$, $b^4$ forming an axis of rotation. The magnitude of this rotatory motion is proportional to the displacement the bolt C is subjected to. The fact is that the deflection of the index relatively to the displacement of the bolt C is proportional to the length of the index, measured from the axis of rotation, relatively to the thickness of the sheet F. In accordance herewith the scale $b^{10}$ is so devised that the position assumed by the index J relatively to said scale $b^{10}$ will directly indicate the magnitude of the displacement carried out by the bolt C. As soon as the caliper gauge is removed from the body to be measured, the movable parts of the instrument, now acted upon by the tension spring H, return into their respective initial positions shown by the drawing, in which the collar $c^1$ of the bolt C bears up against the front end $d^1$ of the screw D.

Since the deflection of the index merely depends upon the length of the index and the thickness of the sheet F, and these two magnitudes can be secured at the desired amount from the very outset and with utmost accuracy without any difficulty, there is no need of providing the measuring instruments, constructed on the lines of this invention, with any special adjusting equipments adapted to change the deflection of the index for the purpose of setting the instrument. It will thus be clearly seen that the construction of the present measuring instrument is far simpler than that of the measuring instruments provided with the aforesaid adjusting equipment and as hitherto known. Since, moreover, the notches of the block supporting the index J are established by a sheet ground down to a most accurate dimension being caused to project beyond the said block there are bound to result for the edge-portions bearing up against the knife-edges $b^3$, $b^4$ and $e^3$, $e^4$ lines of such accuracy and sharpness such as could simply never be produced by tooling a notch in the member proper. The subject matter of this invention consequently excels by virtue of a form of construction adapted to warrant a particularly delicate measuring capacity. Further, the arrangement of the two notches symmetrically to the tension spring H yields the advantage of the block being forced against the knife-edges $b^3$, $b^4$ and $e^3$, $e^4$ in a perfectly uniform manner. Finally, by the provision of the slots $g^4$, $g^5$, the possibility is provided of disposing the point of application of the tension spring H as closely as possible to the axis of rotation of the index J, formed by the stationary knife-edges $b^3$, $b^4$. The travel of the spring is thus reduced to a particularly small extent. It is this fact, however, which augments its usefulness for continuous service, as then the tension of the spring will remain much longer uniform than if it were obliged to travel for a considerable distance in the course of each measuring operation.

Claims:

1. In a measuring instrument provided with a reading-off device, a lever forming the movable part of said reading-off device, a spring connected to said lever and to the body of the measuring instrument tending to draw said lever into its normal position, knife edges forming bearings for said lever, said knife edges being supported by the measuring instrument body and a displaceable bolt, and a plate secured to said lever and forming therewith bearing faces to receive said knife edges.

2. In a measuring instrument provided with a reading-off device and a body portion, a lever forming the movable part of said reading-off device, a spring connected to said body and to said lever and tending to draw said lever into its zero position, knife edges forming bearings for said lever and arranged in a fork-like manner, said knife-edges being supported by said body and a bolt movable in said body respectively, bearing faces on said lever adapted to receive said knife edges, said bearing faces being formed by a thin sheet of metal projecting beyond the body of said lever, said spring being attached to said lever at a point situated between said fork-like knife edges.

3. In a measuring instrument provided with a reading-off device and a displaceable bolt, a body portion, a lever within said body and forming the movable part of said reading-off device, spring means connected to said lever and said body tending to draw said lever into its zero position, knife edges secured to said body and to said displaceable bolt and forming bearings for said lever, said lever being formed with an enlarged body portion, bearing faces on said lever body adapted to receive said knife edges, said bearing faces being formed by a thin sheet of metal projecting beyond said body portion, said spring being attached to said sheet of metal.

4. In a measuring instrument having a body, a reading-off device and a displaceable bolt, a lever provided with an enlarged body portion and forming the movable part of said reading-off device, a spring connected to said lever and to said body tending to draw said lever into its zero position, knife edges forming bearings for said lever, said knife edges being secured to said body and displaceable bolt respectively, said lever being formed with bearing faces to receive said knife edges, said bearing faces being formed by a thin sheet of metal projecting beyond the body of said lever, said spring being attached to said sheet of metal at a point situated between said knife edges.

5. In a measuring instrument provided with a body, a reading-off device and a displaceable bolt, a lever forming the movable part of said reading-off device, spring means secured to said lever and to said body tending to draw said lever into its zero position, knife edges forming bearings for said lever, means carrying said knife-edges secured to said body and displaceable bolt respectively, said lever having a body portion provided with bearing faces for the reception of said knife edges, a thin sheet of metal secured to said lever body and projecting therebeyond forming said bearing faces, said spring being attached to said sheet of metal at a point situated between said knife edges and in close proximity to the axis of rotation of said lever.

The foregoing specification signed at Stockholm, Sweden, this 11 day of October, 1920.

KARL LAUER.

In presence of—
P. A. HERNELL,
G. SJAGREN.